United States Patent [19]

Jennings

[11] 4,079,859

[45] Mar. 21, 1978

[54] TECHNIQUE AND DEVICE FOR MEASURING FLUIDS

[76] Inventor: J. Thomas Jennings, 5 Hickory Rd., Short Hills, N.J. 07078

[21] Appl. No.: 744,986

[22] Filed: Nov. 26, 1976

[51] Int. Cl.$^2$ .............................................. G01F 11/26
[52] U.S. Cl. ........................................ 222/1; 222/158; 222/437; 222/454; 222/475
[58] Field of Search .................. 222/1, 158, 437, 441, 222/454, 457, 475, 564, 456; 73/426-428

[56] References Cited

U.S. PATENT DOCUMENTS

| 236,997 | 1/1881 | Dodge | 222/454 X |
| 1,093,740 | 4/1914 | Stevenson | 222/158 |
| 2,017,209 | 10/1935 | Kennedy | 222/158 |
| 2,640,628 | 6/1953 | Klosky | 222/158 X |
| 2,645,388 | 7/1953 | Hester | 222/454 |
| 2,980,297 | 4/1961 | Tucci | 222/158 |
| 3,028,983 | 4/1962 | Barr | 73/427 X |
| 3,254,809 | 6/1966 | Breneman | 222/454 X |
| 3,401,840 | 9/1968 | McConnell et al. | 222/158 |

Primary Examiner—Robert B. Reeves
Assistant Examiner—Fred A. Silverberg
Attorney, Agent, or Firm—Martha G. Pugh

[57] ABSTRACT

A technique and apparatus for measuring liquids and granular materials comprising a measuring head which may either take the form of an attachment to or an integral part of a conventional primary container. The measuring head comprises two elements: (1) an upwardly extended modifying pour spout seated on the mouth of the primary container and disposed at an acute clockwise angle to the axis of the primary container; and (2) a measuring vessel which encloses or is coupled to the modifying pour spout of the primary container, and which has its own dispensing mouth disposed at a counterclockwise angle relative to the axis of the primary container. The pour angle of the primary container is so modified relative to the dispensing mouth of the measuring vessel that the filled contents of the measuring vessel can be completely dispensed without any of the contents of the primary container escaping into the measuring vessel. Further, the relative pour angles of the primary container and the dispensing mouth of the measuring vessel are so related that when the primary container is tipped with its axis at a preselected obtuse angle in a counterclockwise direction to the vertical reference, its entire contents can be dispensed through the dispensing mouth of the measuring vessel. A pair of indicating scales on the transparent or translucent measuring vessel permit the contents to be measured in pour-to-measure position and to be remeasured when the axis of the primary container is vertical. An added scale measures the amount of the contents remaining in the measuring vessel after pour-back to the primary container. The measuring vessel can be uncalibrated or calibrated in English volumetric units, or in metric volumetric units, or in both.

10 Claims, 23 Drawing Figures

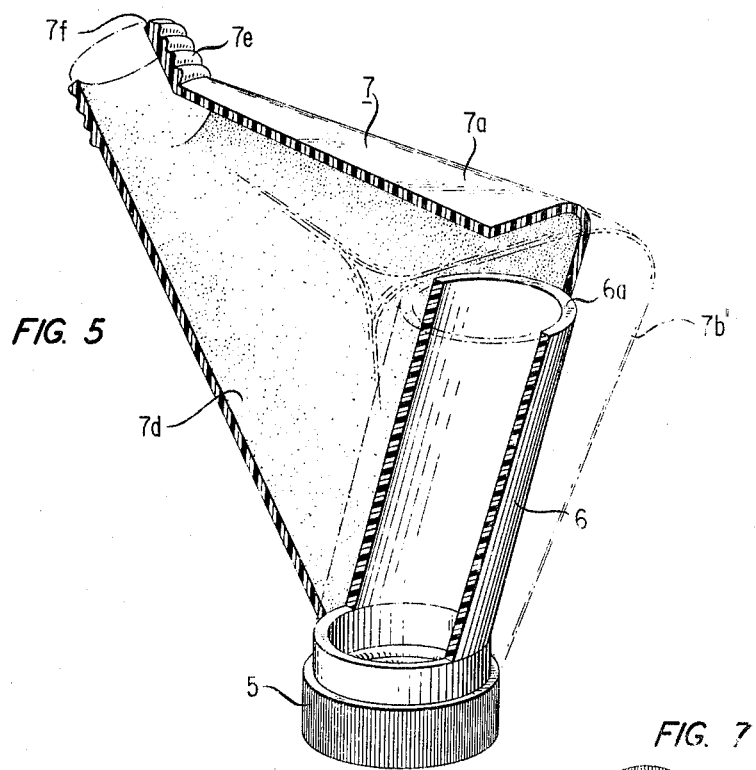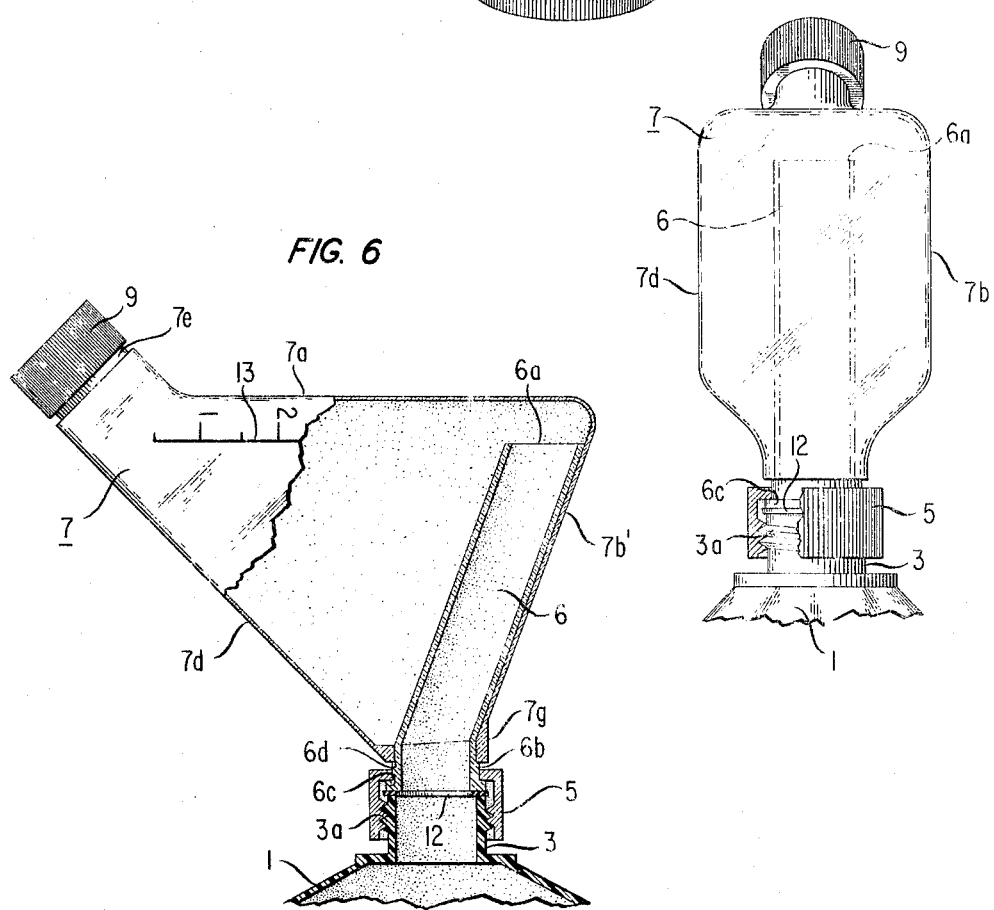

TECHNIQUE AND DEVICE FOR MEASURING FLUIDS

BACKGROUND OF THE INVENTION

This relates in general to techniques and apparatus for measuring the amount of either fluid or granules dispensed from a primary container; more particularly, using a measuring head which may or may not be integrally formed with the primary container.

It is common knowledge that many liquids and granules of dry products are delivered to the end user in a concentrated form and must be mixed by the user with another fluid or solvent (generally water) in some specified proportion in order to qualify for use. Concentrated detergent conventionally used in washing machines is one example; household garden chemicals provide another example. At worst, such operations may be dangerous; and at best, they are cumbersome and messy, leading to inaccurate results.

SUMMARY OF THE INVENTION

It is the primary object of this invention to provide a simpler and more efficient means for measuring fluids or granules than now available in the prior art. A more specific object of this invention is to provide means for accurately measuring a specified volume of material and subsequently dispensing it.

Another object of the invention is to provide for comparative measurement between different volumetric systems, such as, for example, between metric and English measurments.

These and other objects are realized in accordance with the technique and apparatus of the present invention which make use of an attachment for measuring liquids and granular materials, which attachment may or may not be integrally formed with a conventional type of primary vessel or container. The attachment comprises a two-piece measuring head. The first element is a modifying pour spout which is attached to the mouth of the primary container so that the axis of the spout forms an acute angle in, say, a clockwise direction, with the axis of the primary container. This modifying pour spout radically increases the angle (called the "starting pour angle") through which the primary container must be tipped before its contents begin to pour out. The second element is a measuring vessel which, in a preferred embodiment, encloses the modifying pour spout of the primary container, and which has its own dispensing spout spaced apart along an arc in, say, a counterclockwise direction from the pour spout of the primary container, so that when the closure is removed from the filled measuring vessel, its measured contents can be completely dispensed without any of the contents escaping from the primary container. In an alternative embodiment, the modifying pour spout of the primary vessel is disposed externally to the measuring vessel.

In preferred form, the measuring vessel, which is of transparent or translucent material, has inscribed on its surface a pair of calibrated scales, one of which is disposed to measure the volume of the contents in closed, pour-to-measure position, and another of which is disposed to measure the volume when the primary container is returned to its normal vertical position. A scale may also be included to show the contents remaining in the measuring vessel after the container has been tipped in a clockwise direction to return an excess of volume from the measuring vessel to the primary container.

In accordance with a further modification of the invention, the scales on the measuring device may be in metric units, in English units, or in both, thereby providing a basis for measurement in either units.

In preferred form, the measuring head of the present invention is provided with a female screw-threaded receptacle which fits onto a standard container mouth when the top has been removed. In an alternative form, the measuring head can be integrally formed with the mouth of the primary container.

The following are salient features of the measuring technique and apparatus of the present invention:

1. It provides for the visual measurement of a volume of fluid or granulated dry material without the necessity of unsealing the primary container.

2. It provides for the visual measurement on a unique remeasure scale of a volume of fluid or granules, a portion of which may be returned to the main vessel, if desired, without the need for unsealing the primary container.

3. The invention provides for the measurement of a volume of fluid or granules to be poured from the measuring vessel without removing any of the remaining fluid or granules from the primary container. No mechanical devices or mechanisms are employed; and no moving parts are utilized.

4. The invention allows for the fluid in the measuring vessel to be dispersed completely; and also allows the contents of the primary container to be emptied if necessary. Provision is made for pour-back from the measuring vessel into the primary container, in the event that a measured quantity of fluid or granules is in excess of the amount required. These operations may be accomplished without any adjustments or changes in the measuring head, except removal of the closure from the measuring head.

5. The invention provides for a device which can be used on any container of any shape or size, and does not require any special design or features in the primary container.

These and other objects, features and advantages will be realized in a study of the specification hereinafter with reference to the attached drawings.

BRIEF DESCRIPTION OF THE DRAWINGS

FIG. 5 is a perspective showing of a preferred embodiment of the invention, partly cut away to show the interior;

FIGS. 6 and 7 are showings, in cross-section and rear end elevation, respectively, of the measuring vessel of the type shown in FIG. 5;

DETAILED DESCRIPTION

Preferred Embodiment

It is a well-known fact that fluid in a container will seek a level parallel to the surface of the earth, and will pour from the top of the container when the latter is rotated in a plane normal to the earth's surface. The angle at which the fluid will begin to pour from the container depends on many factors relating to the shape of the container, including the shape of its spout or neck.

Figure 1:
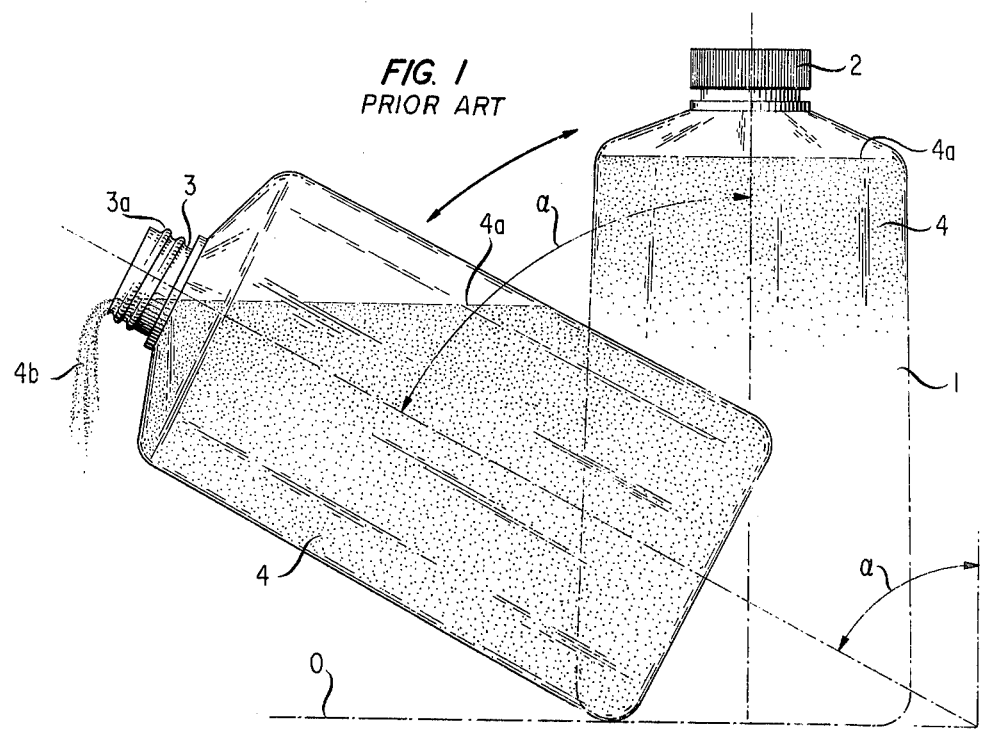
FIG. 1 shows, in perspective, a conventional container of liquid in upright and pour-out positions.

Referring to FIG. 1, there is shown a prior art container 1 of glass or plastic, of conventional shape, say, 7 to 12 inches tall and, say, 4 inches in diameter and having a conventional closure 2, say, 1 to 1½ inches in outer diameter mounted on a screw-threaded neck terminating in mouth 3. If the diameter of the mouth 3 is approximately one-quarter the width of the container and the latter is initially substantially full of liquid 4, pouring or flow 4b will occur when the pour angle $\alpha$ (between a line vertical to the earth's plane 0 and the axis of the container) reaches, say, 35°, depending on the shape of the container. Pouring will continue until the container is rotated through an angle of over 90° in the vertical plane, at which angle the container is completely emptied. The liquid level 4a in the container remains parallel to the earth's plane, indicated by line 0.

Figure 2A:
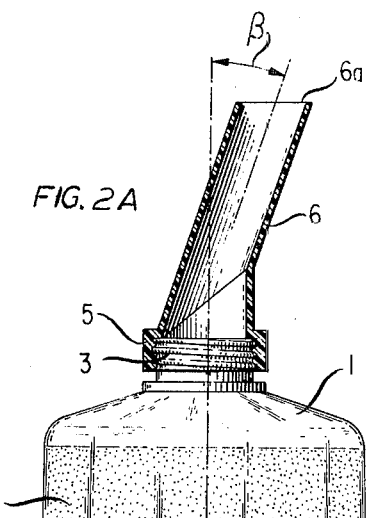
FIG. 2A shows the container of FIG. 1 partially modified to include a modifying pour spout disposed at an angle to the mouth of the container.
Figure 2B:
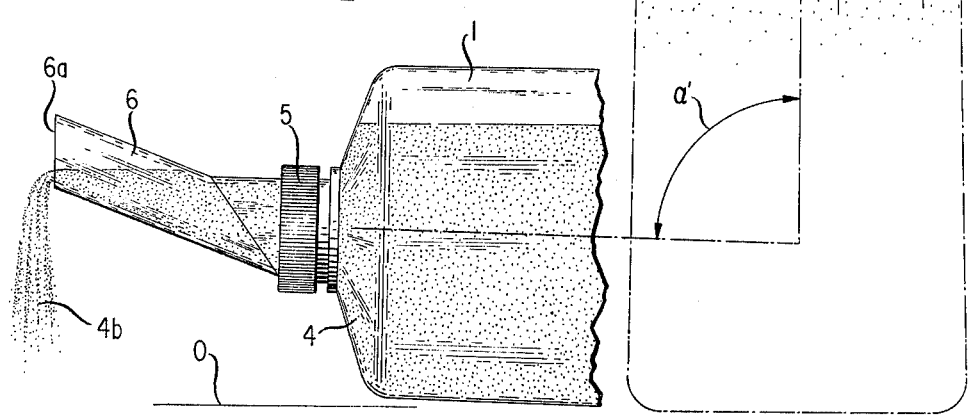
FIG. 2B is a fragmentary showing of the modified container of FIG. 2A in pour-out position.

If, however, as shown in FIG. 2A, a modifying pour spout comprising a tube 6, say, 3½ inches long and about one inch in inner diameter, is mounted with its axis at some acute angle $\beta$ (say, 20° to 25°) in a clockwise direction from the vertical axis of the container 1, the latter must be turned through a much greater pour angle $\alpha'$ in the opposite direction before pouring will occur, so that both the starting and emptying pour angles are thereby modified, the latter to a lesser degree than the former.

The following terms will be defined for reference in the specification and claims hereinafter. The "starting pour angle" is defined as the angle between the vertical and the principal axis of the container when the container begins to pour, as it is rotated in a direction which will be called the "principal pour direction" in a vertical plane; and "emptying pour angle" is defined as the angle between the vertical reference and the principal axis of the container when the container is completely emptied out as it is further rotated in the principal pour direction.

The foregoing establishes that any vessel has a starting pour angle which can be modified by the addition of a modifying pour spout, as shown in FIG. 2A. Adding a pour spout, such as 6, disposed at an angle in a direction opposite to the principal pour direction will have the effect of increasing the starting pour angle from angle $\alpha$, shown in FIG. 1, to $\alpha'$, as shown in FIG. 2A. It will be understood that among those factors affecting the modified pour angle are the following:

1. The shape of the primary container;
2. The diameter of the modifying pour spout;
3. The relative angle between the centerline of the modifying pour spout and the axis of the primary container;
4. The size of the opening between the modifying pour spout and the primary container (which can, for example, be changed by a gasket); and
5. The viscosity of fluid being measured.

It will be understood that each of these angles will be a function of the amount of liquid in the container. For the purposes of definition, the angles referred to will be measured when the vessel and the primary container are filled approximately to their maximum designed volume.

Figure 3A:
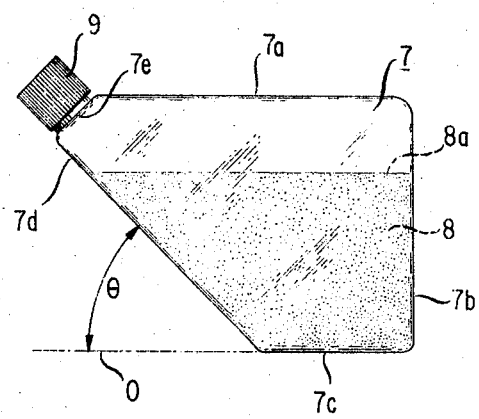
FIGS. 3A, 3B and 3C show, in side elevation, a measuring vessel in accordance with the present invention in upright, tipped and complete pour-out positions.

Referring now to FIG. 3A, there is shown, in cross-section, a vessel 7 which has a configuration such that the left-hand retaining wall 7d thereof, which in the present example is, say, 4 inches long, is disposed at an angle $\theta$ of approximately 45° to the base wall 7c, which is, say, 2 inches long, forming a right angle with the right-hand retaining wall 7b which is, say, 3⅝ inches high. The top of vessel 7a is straight across in a horizontal plane, being 4¼ inches long, terminating at the left-hand end in a dispensing spout 7e, about 1 inch in diameter, which is normal to 7d, so that the mouth 7f of spout 7e forms an angle of, say, 135° with 7a. Dispensing spout 7e is closed with a closure 9.

Figure 3B:
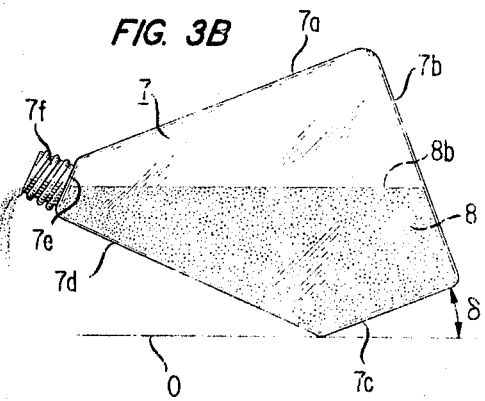
Figure 3C:
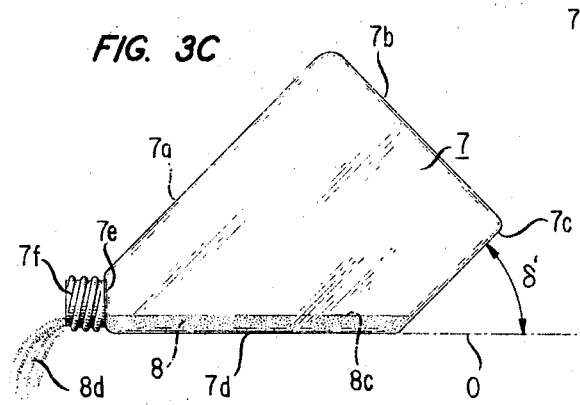

The starting pour angle $\delta$ for vessel 7, when approximately two-thirds full, is very small (5°–10°), as shown in FIG. 3B; and vessel 7 will completely empty at the angle $\delta'$ (equal to $\theta$) when the retaining wall 7d is parallel to the surface of the earth, as indicated by line 0. (See, FIG. 3C.)

Figure 4:
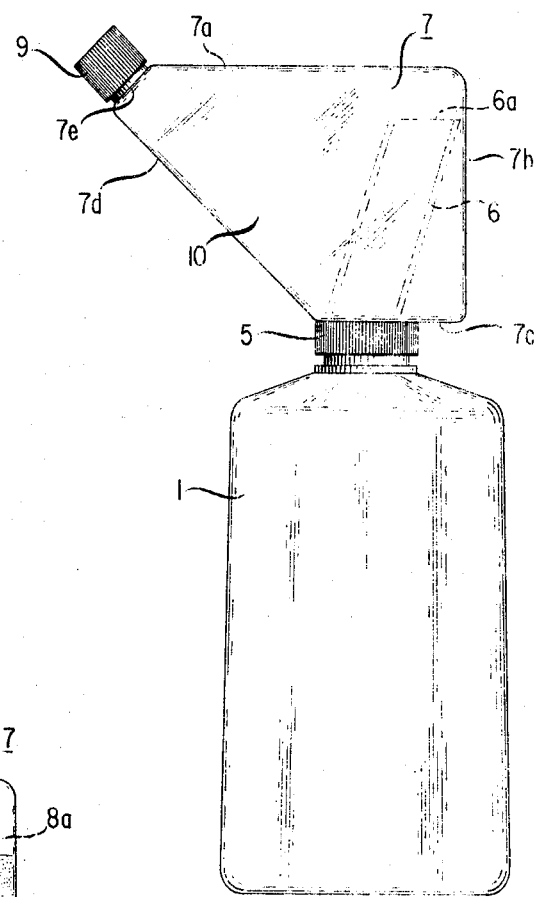
FIG. 4 shows a measuring vessel of the type shown in FIGS. 3A, 3B and 3C disposed on a conventional container which is combined with a modifying pour spout of the type shown in FIG. 2A.

In accordance with the present invention, a modifying pour spout for the primary container 1, such as the spout 6 of FIG. 2A, is combined with an enclosing vessel 7 of substantially the form shown in FIG. 3A, to provide an assembly such as shown in FIG. 4, which is screwed or otherwise fitted onto a standard container 1, in the manner illustrated. In this combination, an internally screw-threaded cylindrical fitting 5 is provided to mate with a projection on the bottom wall 7c of the vessel 7, the fitting being roughly, say, one inch in outer diameter and designed to fit in a conventional manner on the screw threads 3a at the neck of container 1, in a manner which will be described in greater detail with reference to FIGS. 5, 6 and 7 hereinafter. The resulting assembly now includes two vessels, the conventional container 1 and measuring vessel 7, each having substantially different pour angles. Container 1, which originally had a starting pour angle of 35° to 40°, has been modified by the pour spout 6, so that it now has a starting pour angle of 100° to 105°; and vessel 7, the design of which is substantially unaffected by assembly, retains its starting pour angle at 5°, and empties out completely at an emptying pour-out angle of 45° when the wall 7d is rotated counterclockwise to a position parallel to the earth's plane. The addition of the pour spout 6 to container 1 also provides a trap area 10 within vessel 7 which in rest position of the container 1 is below the mouth of modifying pour spout 6, so that the trapped fluid cannot enter container 1. Although in the present embodiment the axis of modifying pour spout 6 is, say, 3¼ inches long and forms an angle β about 20°-25° in a clockwise directon from the reference centerline of the primary container 1, it will be understood that the length of this spout and its angle of disposition with the normal can be varied over a wide range, the principal criterion being that a difference of, say, 25° to 50° should be retained between the emptying pour-out angle of vessel 7 and the starting pour angle of container 1 when the latter is rotated in a counterclockwise direction. This is called the nonpour arc.

FIG. 5 shows in perspective, partially broken away, a measuring head in accordance with the present invention including modifying pour spout 6 and measuring vessel 7. The internally screw-threaded fitting 5 serves to couple the measuring vessel 7 including the modifying pour spout 6 in fluid-tight relation to the mouth 3 of the primary container 1, so that the measuring head can be removed from the latter as desired. In this modification, the rear wall 7b' is made to conform tangentially to the angular orientation of the modified pour spout 6, so that the latter can be bonded to the former, as will be described with reference to FIGS. 6 and 7. Assuming the closure 9 is removed, vessel 7 will pour and empty when tipped at angles to the vertical of from 5° to 45°. Primary container 1 will not commence to pour until an angle of approximately 100° to 105° is reached as the container is rotated in the principal pour direction; thus, any fluid trapped in vessel 7 will pour and the vessel will empty before any additonal fluid is poured into vessel 7 from container 1.

Accordingly, if the combined unit, comprising container 1 and modifying pour spout 6 enclosed in vessel 7, is only rotated through an arc not exceeding 0° to 50°, all fluid trapped in vessel 7 will pour, causing the vessel to empty; and no fluid from container 1 will pour during this orientation.

The shape of the modifying pour spout 6 is preferably of a form which will maximize the flow on the remeasure cycle (to be described hereinafter). It will be understood that the shape of the modifying pour spout 6 is not limited to the round crosssection shown by way of example, but that within the contemplation of the invention are alternative cross-sectional shapes, such as oval, square, oblong, etc., any of which could conceivably be used. It will also be understood that the viscosity of the liquid employed will affect the design of the internal pour spout.

Referring to FIGS. 6 and 7, there is shown in crosssection and end elevation, respectively, a preferred embodiment of the present invention, indicated in perspective in FIG. 5.

In the embodiment shown, the measuring vessel 7 is formed of a substantially rigid transparent or translucent material, such as glass or plastic. The vessel 7 is, for example, of transparent polystyrene, having a wall thickness of, say, 1/16 inch, which may be formed by injection molding techniques, blow molding or by any combination of processes well-known in the art of container manufacture.

In the example under description, the measuring vessel 7 is 5 13/16 inches at its widest portion near the top 7a, which in the vertical reference position extends about 4½ inches straight across in a horizontal plane from the projection of the rounded right-hand corner. The spout portion 7e projects to the left, forming an angle of about 135° with 7a, extending about ¾ inch out therefrom to form the mouth 7f of the spout, which has an outer diameter of 1¼ inches. Spout 7e takes the form of a male screw fitting having an inner diameter of 11/16 inch and extending outwardly and upwardly nearly one inch, to mate with an internally screw-threaded closure 9. The lower left-hand wall 7d extends down and to the right 5⅛ inches at an angle of 45° with the horizontal. The right-hand wall 7b' extends 3¾ inches down and slightly to the left from the projection of the rounded upper right-hand corner, forming an angle of 20° with a vertical upwardly extending collar 7g. The lower connecting end of vessel 7 is 1 3/32 inches in outer diameter and ⅞ inch in inner diameter across the lower edge, being slightly thickened at the base to form the collar 7g.

The modifying pour spout 6 has at its lower end a hollow vertically disposed cylindrical base portion 6b about ½ inch high, which is ⅞ inch in inner diameter. At the lower edge, base 6b has an outwardly directed horizontal flange 6c about 1/16 inch wide and 3/32 inch high. At a distance ¼ inch up from the lower edge, base 6b has an external annular shoulder 6d which accommodates the lower internal end of the collar 7g. Fixed to the top edge of base 6b is the spout 6, which takes the form of a tube of, say, polystyrene having a wall thickness of, say, 1/16 inch, and having its axis disposed at an angle of 18° in a vertical plane, in a clockwise direction with the principal axis of base 6b. Inasmuch as they are directed substantially at the same angles in the vertical plane, the modifying pour spout 6 contacts the right-hand internal wall 7b of the vessel 7 tangentially, and is bonded to it by any well-known plastic bonding material such as, for example, some form of epoxy resin which dries to form a rigid bond, or by any well-known plastic welding technique. Collar 7g is sealed around its inner periphery to the upper end of base 6b in a similar manner, using a similar type bond.

Referring to FIG. 6, the end face 7b' of vessel 7 is shown to be flat, having an overall width of 2½ inches and height of 4 inches, the lower inch of the face being constricted to an outer width of 1⅛ inches, and an inner width of ¾ inch at its lower end. The lower face of flange 6c sits on an annular gasket 12 of real or synthetic rubber, or any other suitable gasket material, which is about 1/16 inch thick, and which rests on the top edge of the mouth 3 of the primary container 1. The cylindrical internally screw-threaded closure 5 takes the place of a conventional closure 2, mating with the screw threads 3a on the mouth 3 of container 1. The annular inwardly directed flange at the top of 5 rests its undersurface on the upper surface of flange 6c, acting as a bearing for rotation in a horizontal plane of the measuring head assembly. It will be seen from the above that the measuring vessel 7, including modifying pour spout 6, can be turned 360° in a horizontal plane, about the principal axis of container 1.

Figure 8A:
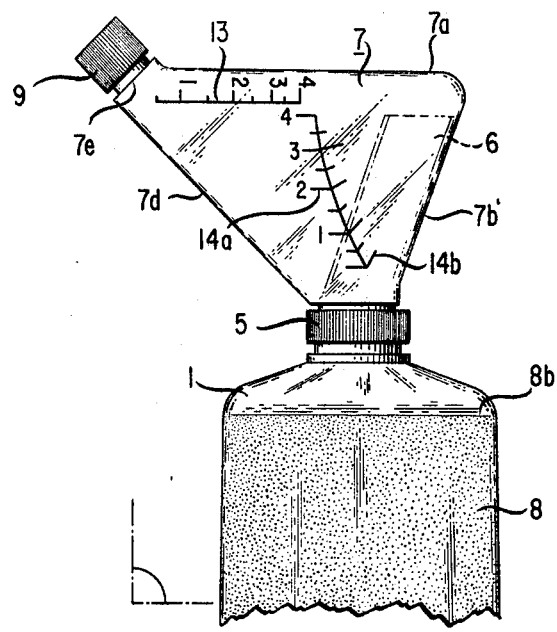
FIG. 8A shows the measuring vessel and primary container of the present invention, including measuring and remeasuring scales.

Referring to FIG. 8A of the drawings, there is shown a primary container and measuring head combination in accordance with the present invention in which a measuring vessel 7 is engraved, etched or otherwise marked with the scales 13 and 14a, 14b, which may either be on an internal or an external surface of the vessel. In the embodiment under description, these scales are in English volumetric units, although it will be apparent from later figures that they may also be in metric units, or a combination of English and metric units, or in any other known volumetric units.

Figure 8B:
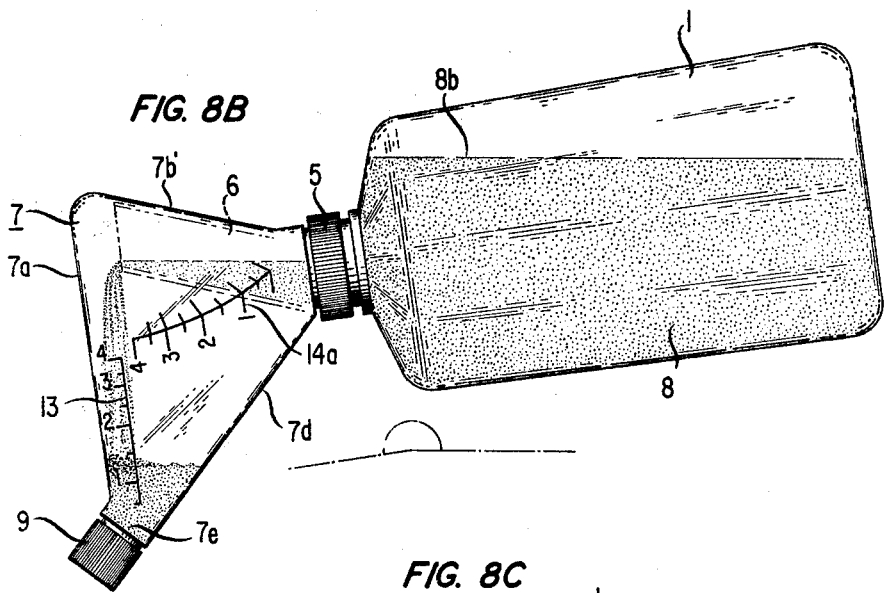
FIGS. 8B and 8C show steps in sequence of pouring out fluid from the primary container and measuring it on a scale in the measuring vessel.
Figure 8C:
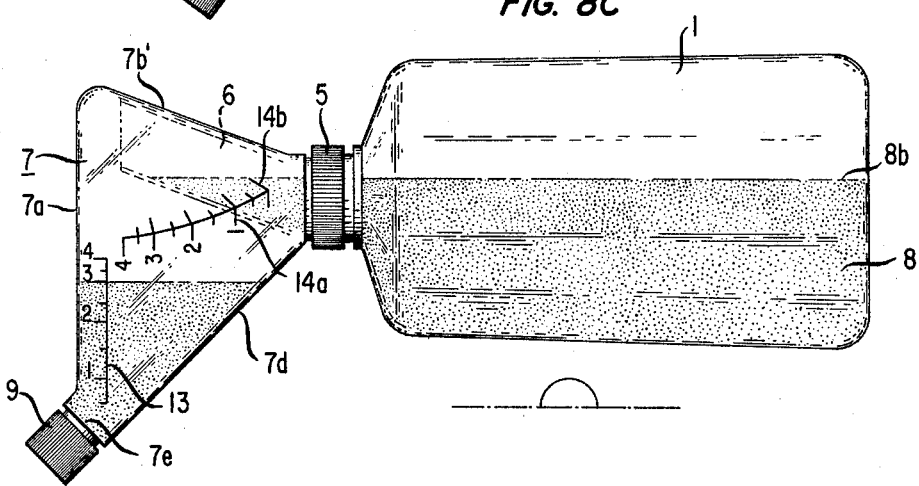

The linear scale 13, which is located adjacent spout 7e parallel to the top face 7a of measuring vessel 7, is calibrated in fluid ounces to measure the liquid or other fluid being poured out of primary container 1. As shown in FIG. 8B, when the assembly is tipped in the principal pour direction, beyond the starting pour angle of primary container 1 as modified by spout 6, the liquid or other fluid is dispensed from the primary container 1 through modifying pour spout 6 and into the measuring vessel 7. When the container and measuring vessel combination is again rotated in the opposite direction, above the starting pour angle of primary container 1 as modified by spout 6, as shown in FIG. 8C, the fluid which has been poured out into measuring vessel 7 is measured against scale 13 when the latter is in vertical position. If closure 9 is removed, a measured amount of fluid is dispensed.

The amount of fluid as initially measured when the assembly is in the position shown in FIG. 8C can be remeasured with the primary container in upright position against scale 14a.

The function of the remeasure scales 14a, 14b is better shown in FIGS. 9A, 9B, 9C and 9D, which show the remeasure pour cycle.

For the purposes of this description, the "starting pour-back angle" is designated as the angle between the vertical and the principal axis of the primary container 1, having a modifying pour spout, as the contents of the measuring vessel 7 begin to pour back into the container 1 as it is rotated in a vertical plane in a direction opposite to the principal pour direction; and the "extreme pour-back angle" is designated as the angle between the vertical and the principal axis of the container when the container 1 begins to pour into mesuring vessel 7 as it is rotated in a vertical plane in said opposite direction. It will be understood, of course, that each of the referenced angles is a function of the amount of liquid in the container under discussion, and will refer to the condition in which the measuring vessel or primary container is filled to its maximum designed volume.

Figure 9A:
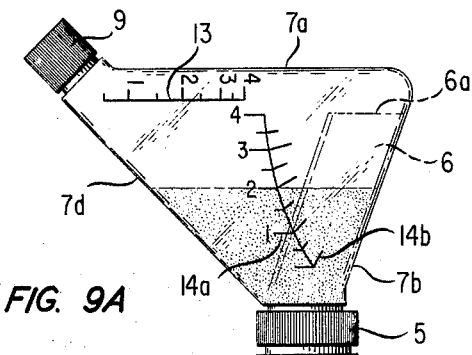
FIGS. 9A–9D show a remeasure sequence in which part of the initial volume is returned to the primary vessel and the remainder is remeasured on the remeasure scale.
Figure 9B:
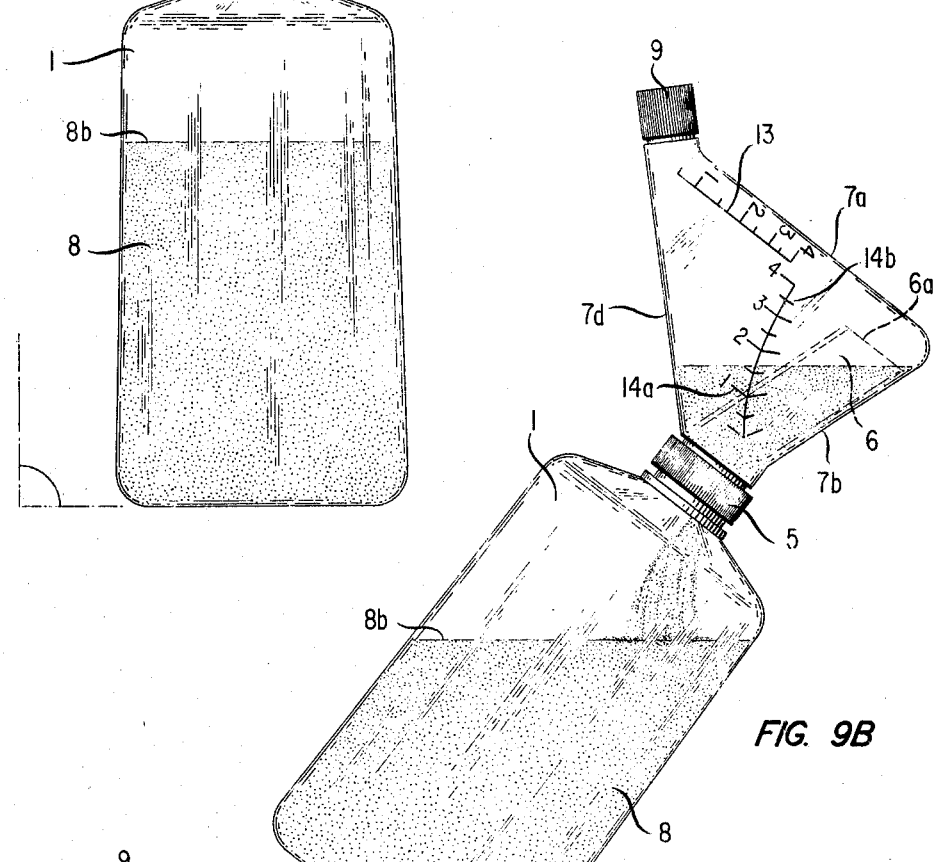
Figure 9C:
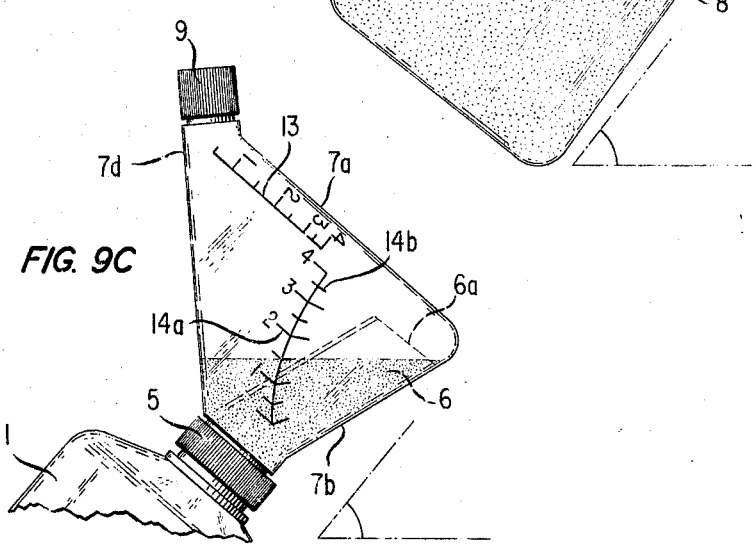
Figure 9D:
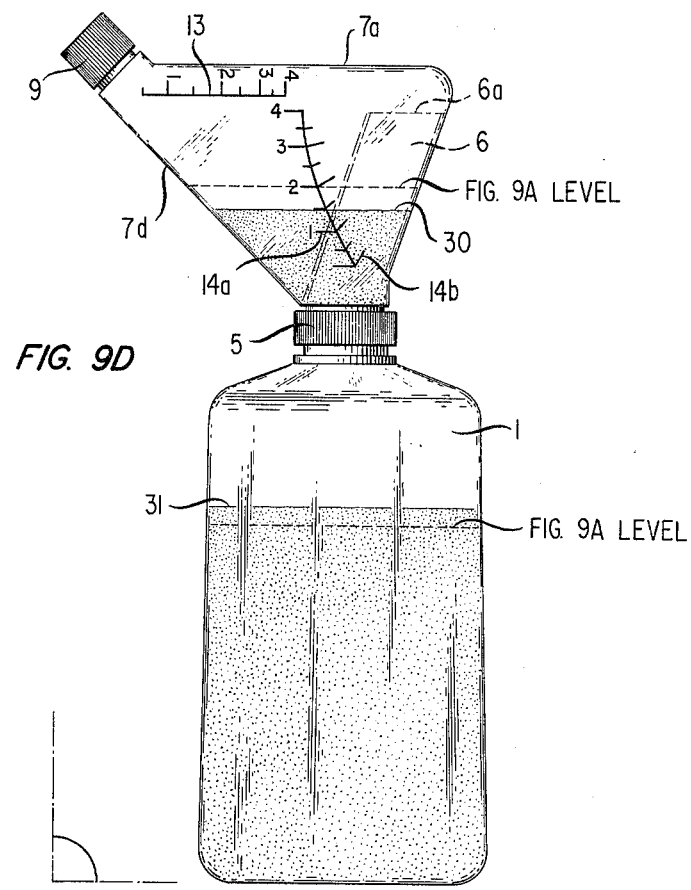

The measuring vessel 7, disposed in a vertical position relative to the axis of container 1, will retain the maximum amount of fluid, the amount retained being a function of the volume of the chamber and the length of the modifying pour spout 6 within the chamber. If the measured amount in vessel 7 is found to be in excess of that desired, the container 1 and measuring vessel 7 are tipped in a direction opposite to the principal pour direction (which is clockwise in the present illustration), so that liquid in measuring vessel 7 will now flow into the mouth 6a of spout 6, and back into primary container 1. FIG. 9C indicates a remeasurement being made against scale 14b of the fluid remaining in measuring vessel 7 after pour-back of the excess into the primary container 1. Referring to FIG. 9D, when container 1 reassumes an upright position, the fluid in the measuring vessel 7 assumes a lower liquid level 30; and the liquid in the primary container 1 assumes a higher liquid level 31, the dotted lines showing the earlier liquid levels. It will be apparent that the shape and calibration marks on scale 13, and more particularly on scales 14a, 14b, will depend on the shape and size of the measuring vessel involved.

It will be understood that the remeasuring scale 14b may take various shapes depending on the volume of fluid remaining when the unit is tilted in a direction opposite to the principal pour direction. It is contemplated that the scale can take the form of a straight line or a curved line; and that the scale may be linear or nonlinear, and curved forward or backward. In preferred form, the remeasure lines will radiate from the point at the upper end of the modified pour spout 6 at which the fluid flows back into the primary container, the volume of the measuring vessel 7 below this point dictating the shape of the scale. The positions of intersection of the calibration lines are determined by the horizontal lines associated with the same volume when the main vessel is held in a vertical orientation. The volumetric capacity of the unit is preferably designed so that the scale is reasonably linear and has sufficient spacing to facilitate an ease of measuring. The shape of the measuring chamber 7 is preferably designed to aid the user to make more accurate measurements in the lesser volumes (one-quarter to one ounce).

Figure 10:
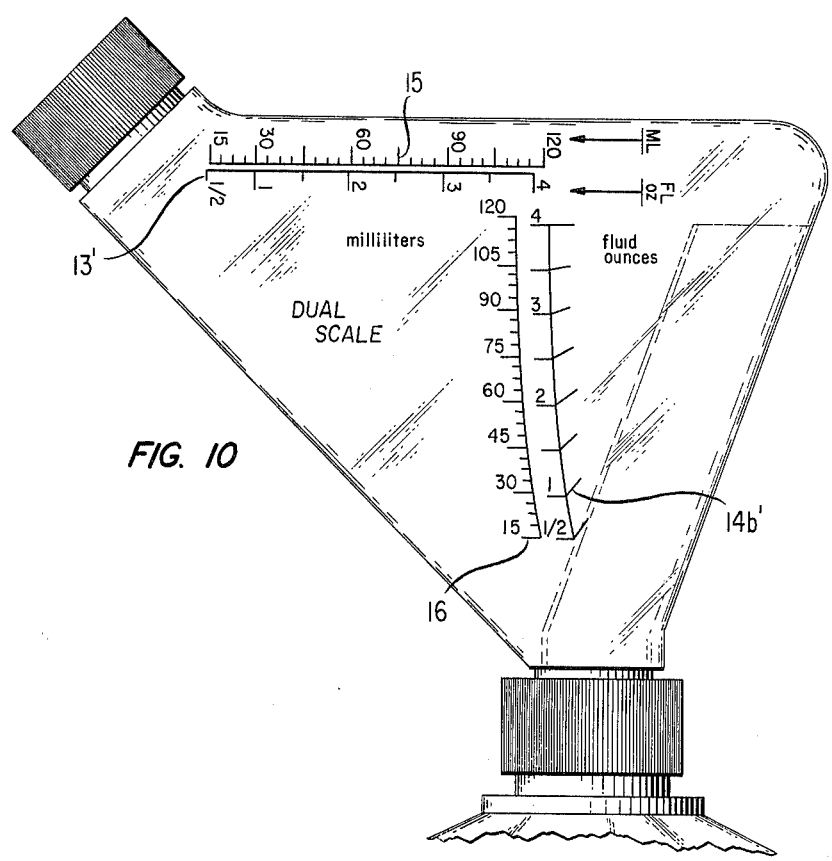
FIG. 10 shows a modification of the measuring vessel of FIG. 8A which includes both English and metric units for comparative volumetric measurement.

FIG. 10 shows a modification of the scale 14a, 14b of the previously described figures in which scales 15, 16 of metric volumetric units (milliliters) are interposed adjacent each of the corresponding scales 13' and 14b' of English volumetric units (fluid ounces), permitting a ready comparison. It will be apparent that any other desired units can be used on the measuring vessel 7, such as, for example, cups, teaspoons, etc., or, alternatively, no units at all.

Figure 11:
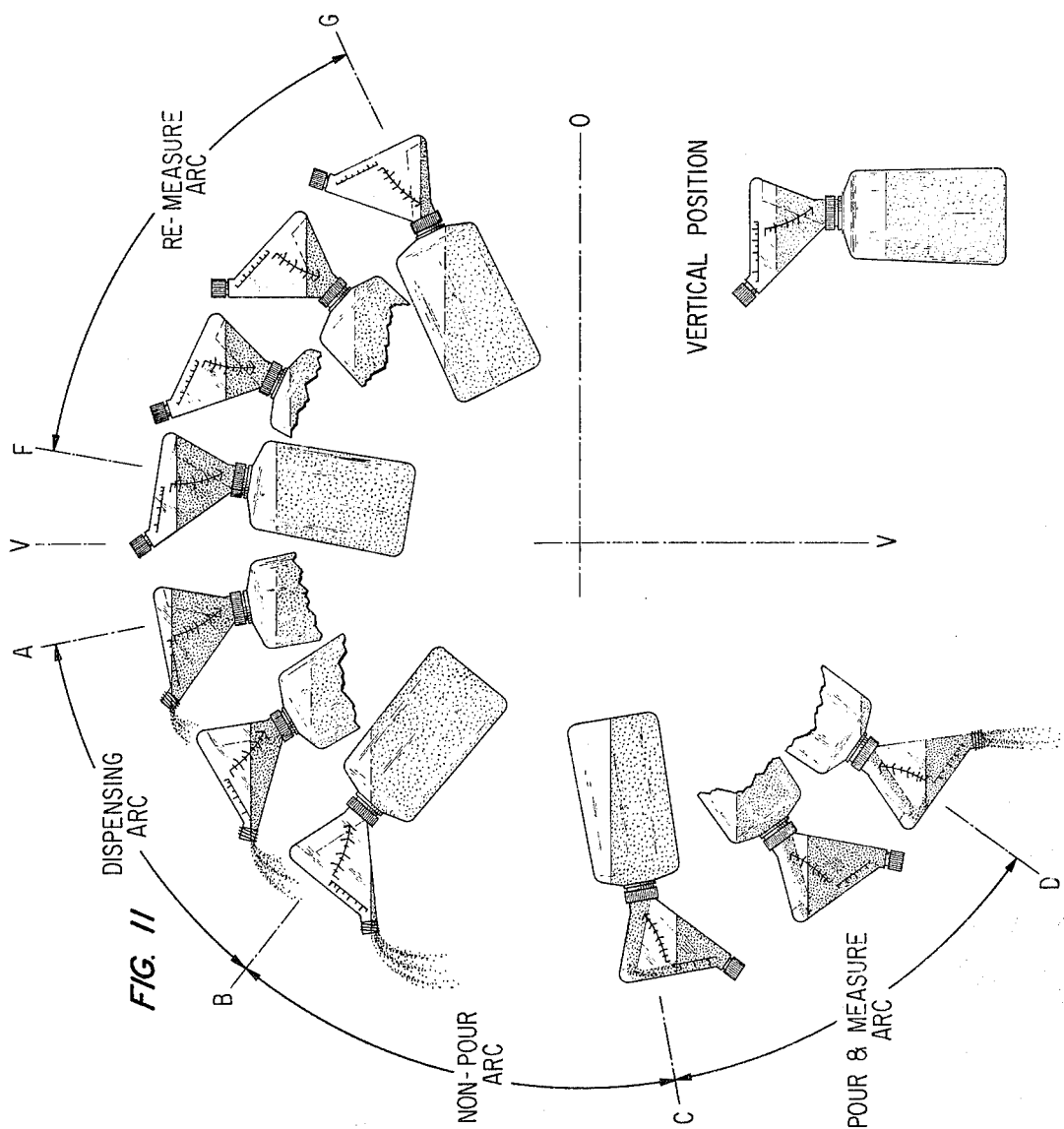
FIG. 11 shows, schematically, a container including a measuring vessel in accordance with the present invention, rotated through a series of arcs representing dispensing, remeasuring, nonpour, pour-to-measure and pour-to-empty positions.

Referring now to FIG. 11, there is shown a series of ten figures, and a reference figure, which scehmatically portray a succession of positions which may be assumed by a container to which a measuring head in accordance with the present invention is attached in performing each of its functions, namely:

1. Rotation in the principal pour direction (counterclockwise in this example) to pour a portion of liquid from the primary container into the sealed measuring head for measurement;

2. Rotation in the opposite direction (clockwise in this example) to remeasure the liuid initially poured out, and to remeasure and return any excess to the primary container; (measuring head sealed)

3. Rotation in the principal pour direction (counterclockwise in this example) through a nonpour arc which is defined between the emptying pour angle of the measuring vessel 7 and the starting pour angle of the primary container;

4. Rotation in the principal pour direction (counterclockwise in this example) through a sufficient arc for dispensing the portion of the measured contents from measuring vessel 7 without dispensing additional fluid from primary container 1; (measuring head closure removed) and 5. Rotation in the principal pour direction (counterclockwise in this example) through a sufficient arc so that the entire contents of container 1 may be poured out, unmeasured. (measuring head closure removed)

Referring in detail to FIG. 11;

Pour and Measure Function

Assuming container 1 has been filled to approximately its capacity, and that the container 1, including the measuring assembly, is rotated in a vertical plane in a counterclockwise direction from the vertical centerline V through an arc lying between C and D, pouring from the primary container 1 through pour spout 6 to the closed measuring vessel 7 will begin when the arc of rotation approximates 100°; and primary container 1 will be completely emptied when the arc of rotation reaches 135°. The contents of measuring vessel 7 are measured on scale 13 when 7 is in pour position, with closure 9 sealed, and on remeasure scale 14a when the assembly is in upright position.

Remeasure Function

The container 1, including the measuring head, is rotated in a clockwise direction through an arc lying between F and G for the purpose of returning any excess contents from the measuring vessel 7 to the primary container 1; and then remeasuring the contents of vessel 7 on scale 14b. In the present example, assuming measuring vessel 7 is filled to its maximum designed volume, but not overfilled, and remains sealed, the pour-back from vessel 7 to the primary container 1 begins at about 10° in a clockwise direction from the vertical. The primary container, when filled to capacity, will not pour out through spout 6 until a clockwise angle of about 64° from the vertical has been reached. It is seen that as the assembly is rotated through various clockwise arcs between F and G, the fluid constantly assumes a level parallel to the earth's plane, the excess returning to the primary container 1 through the opening 6a of spout 6. By this method the original and reduced amounts of liquid in the measuring vessel 7 after pour-back can be measured on the scale 14b. The measuring head is so designed that minimum or zero volume in the measuring vessel 7 can be achieved.

Dispensing Measured Amount From Measuring Vessel

Assuming removal of closure 9 from measuring vessel 7, and that the latter has previously been filled to its designed volume, it will begin to dispense the entrapped liquid when the primary container and measuring assembly have moved through a counterclockwise arc VA of about 15° from the vertical centerline; and the measuring vessel 7 will be completely emptied of the entrapped liquid when the counterclockwise arc of rotation has increased to B, which in the case of the present embodiment is between 45° and 50° from the vertical. Because of the position of spout 6, no pouring occurs from the primary container 1 to measuring vessel 7 during the rotational arc AB, in which the measuring vessel 7 is dispensing.

Nonpour Arc

At counterclockwise arcs beyond the rotation arc B, after the measuring vessel 7 has been emptied, and before the rotation reaches the counterclockwise arc C, no pouring takes place from the primary container 1. For vessels of the geometry presently disclosed, this nonpour arc BC is between 40° and 50°, which allows a measured amount of fluid to be completely dispensed without any chance of spillover from the reservoir in the primary container 1.

Nonmeasured Pour-Out from Primary Container Without Removing Measuring Vessel

If the closure 9 is removed from the spout of measuring vessel 7, the primary container 1 will begin to pour into measuring vessel 7 when the counterclockwise rotational arc VC reaches 100°, the flow continuing to pass through measuring vessel 7, and being dispensed in unmeasured amounts therefrom. When the rotational angle reaches D at about 130°, the unmeasured pour-out of the contents of the primary container 1 is completed.

Alternative Embodiments

Figure 12:
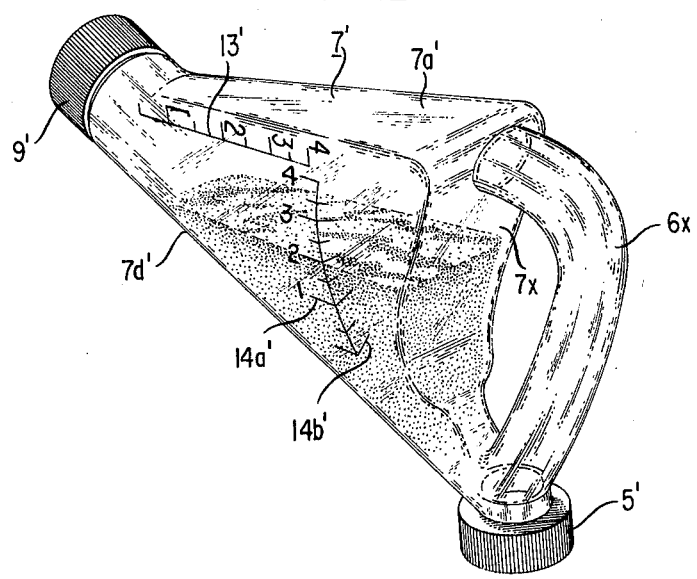
FIGS. 12, 13 and 14, show, in overall perspective, partial section and end elevation, respectively, a modified form of the invention in which the pour spout attached to the primary container is external to the measuring vessel.
Figure 13:
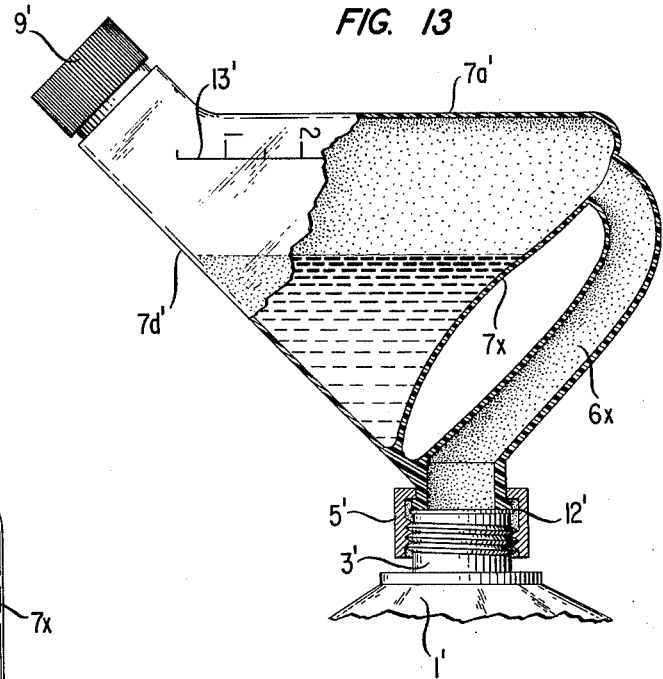
Figure 14:
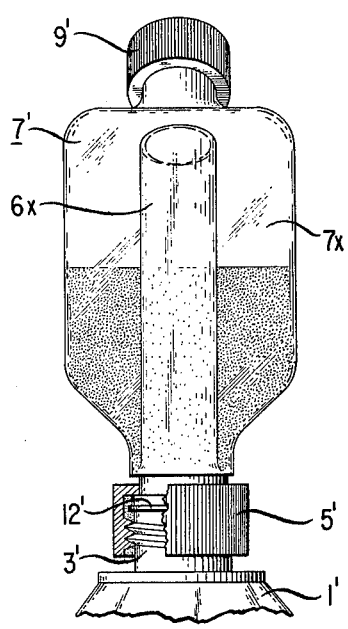

Although the foregoing figures have shown embodiments in which the measuring vessel encloses the modifying pour spout of the primary vessel, it will be understood that different configurations are possible. One such configuration is shown in FIGS. 12, 13 and 14. In this embodiment, the arcuate pour spout 6x, instead of being enclosed in the measuring vessel 7', is external thereto. In the embodiment shown, the end wall 7x of the measuring vessel 7' is spaced apart from the internal wall of the modifying pour spout 6x a maximum separation of, say, ⅛ inch. The lower end of the wall 7x is joined directly to the left-hand end of the inwardly inclined wall 7d' at an angle which may be somewhat less than 45°. The opening in the lower end of the externally disposed modifying pour spout 6x, which in the present embodiment is circular, is secured with its outer periphery sealed in flush relation to the upper edge of the mouth 3' of primary container 1'. Although arcuate, the internal diameter of tube 6x is substantially uniform, having an opening at its upper end which is preferably about equal to the diameter of mouth 3', although it will be understood that the size of these openings can be varied. Tube 6x is secured in fluid-tight relation at its upper end to an opening near the top of the end wall 7x. Although tube 6x has been disclosed in the present illustration as having a round cross-section, it will be understood that it can assume various shapes and still be operative for the purposes of the present invention. In the description of this embodiment, the elements indicated by the primed numbers are similar in form to elements described with reference to corresponding designations in FIGS. 5, 6 and 7. A particular advantage to be had when using the embodiment of FIGS. 12 et seq. is that the modifying pour spout 6x may be rigidly formed so that it performs the dual functions of a supplemental handle of pour spout.

Figure 15:
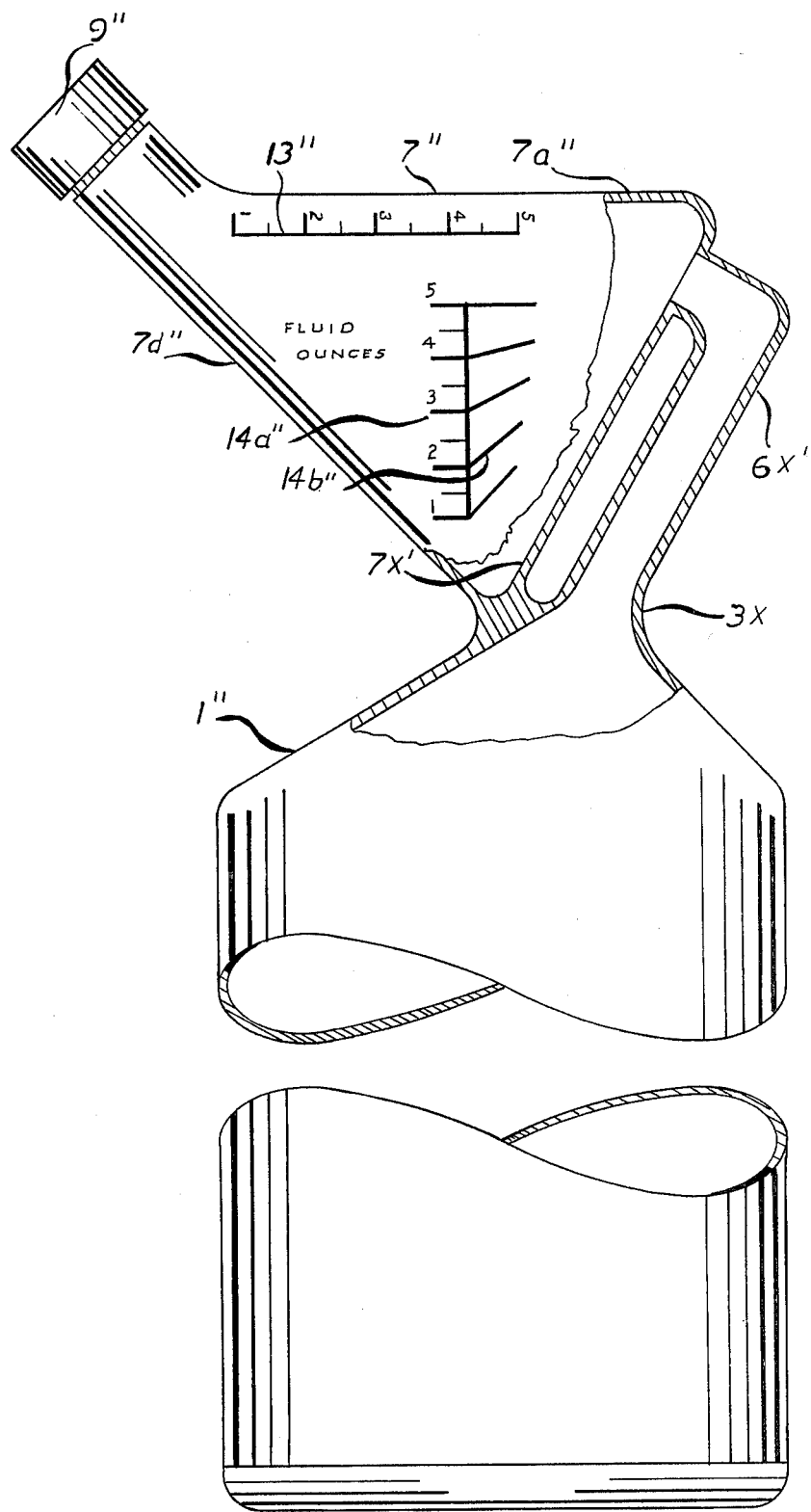
FIG. 15 shows in partial section a modification of the invention in which the measuring head is integrally formed with the primary container.

Another such configuration is that shown in FIG. 15. In this embodiment, the entire measuring head is integrally formed with the primary container. It will be understood that with the exception of the neck 3x, which is integrally formed with the primary container 1", all of the remaining elements of the combination are generally similar to those shown and described with reference to FIG. 13 hereinbefore.

In a further modification of the embodiments of FIGS. 12 et seq., the external spout portion 6x need not be spaced apart from rear wall 7x, but the two can be molded with their walls substantially contiguous.

It will be understood that the present invention is not limited to any of the specific forms described herein by way of example, but only by the scope of the appended claims.

What is claimed is:

1. A device for measuring fluids dispensed from a primary container having an upwardly opening mouth for pouring out fluid when said container is rotated in a vertical plane in a counterclockwise direction at least through its starting pour angle, the principal axis of said primary container being substantially vertical when said container is disposed in its reference position, said device comprising in combination:

a first means comprising a measuring vessel constructed to be secured adjacent to the mouth of said primary container for measuring and dispensing a measured amount of fluid poured out from said primary container, said measuring vessel having a cross-sectional shape in said vertical plane of substantially triangular form comprising an elongated top portion and a constricted base portion at the lower end of said vessel, securing means disposed at said base portion for securing said measuring vessel adjacent the mouth of said primary container, a first lateral wall of said vessel upwardly extended from said securing means forming in said vertical plane an acute clockwise angle not exceeding about 25° with the extended principal axis of said primary vessel, a second lateral wall of said vessel upwardly extended from said securing means forming in said vertical plane an acute counterclockwise angle of between 30° and 60° with the extended principal axis of said primary container, said second lateral wall terminating at its upper end in a dispensing mouth having a removable closure substantially tangential to said second lateral wall in a plane normal thereto, said elongated top portion connecting said second lateral wall including said dispensing mouth with said first lateral wall;

and a second means for modifying the pour spout of the primary container to increase the starting pour angle thereof in said counterclockwise direction comprising a single tube having a lower end and an upper end, said lower end connectable in fluid-tight relation to the mouth of said primary container, and said upper end connected in fluid dispensing relation to said measuring vessel through an opening which is contiguous with the upper end of said first lateral wall;

said measuring vessel being closed except for said dispensing mouth and said opening.

2. The combination in accordance with claim 1 wherein said measuring vessel includes at least one volumetric scale calibrated to measure the contents of said meaasuring vessel.

3. The combination in accordance with claim 2 wherein said at least one volumetric scale includes a first volumetric scale calibrated to measure the contents of said measuring vessel when said primary container is disposed in said reference position, and a second volumetric scale calibrated to measure the contents of said measuring vessel in closed condition when said container is disposed at an angle in said vertical plane in said counterclockwise direction which exceeds the increased starting pour angle of said primary container including said modifying pour spout.

4. The combination in accordance with claim 3 wherein said at least one volumetric scale includes a third volumetric scale calibrated to measure the contents entrapped in said measuring vessel when the axis of said primary container is disposed at a clockwise angle in said vertical plane.

5. The combination in accordance with claim 4 wherein said third scale includes remeasure calibration lines which radiate from the point in the upper end of said modifying pour spout into which fluid first flows to return to said primary container, said lines being so disposed as to intersect horizontal calibration lines on one said scale representing a series of equivalent volumes when said primary container is disposed in its reference position, and wherein said remeasure calibration lines are substantially parallel to the surface of the remaining fluid trapped in the measuring vessel when said primary container is tipped in said clockwise direction in said vertical plane at each of a progression of pourback angles.

6. The combination in accordance with claim 2 wherein said at least one volumetric scale includes a first volumetric scale calibrated to measure the contents of said measuring vessel in English volumetric units, and a second volumetric scale calibrated to measure the contents of said measuring vessel in metric volumetric units, said scales being disposed in comparative relation.

7. The combination in accordance with claim 1 wherein said modifying pour spout comprising said tube is spaced apart externally from said first lateral wall of said measuring vessel and is constructed to serve as a handle for said measuring vessel.

8. The combination in accordance with claim 1 wherein said modifying pour spout comprising said tube is disposed internally in said measuring vessel, and an external wall of said tube is substantially juxtaposed with said first lateral wall of said measuring vessel.

9. A device for measuring fluids dispensed from a primary container having an upwardly opening mouth for pouring out fluid when said container is rotated in a vertical plane in a counterclockwise direction at least through its starting pour angle, the principal axis of said primary container being substantially vertical when said container is disposed in its reference position, said device comprising in combination:

a first means comprising a measuring vessel constructed to be secured adjacent to the mouth of said primary container for measuring and dispensing a measured amount of fluid poured out from said primary container, said measuring vessel having a cross-sectional shape in said vertical plane of substantially triangular form comprising an elongated top portion and a constricted base portion at the lower end of said vessel, securing means disposed at said base portion for securing said measuring vessel adjacent the mouth of said primary container, a first lateral wall of said vessel upwardly extended from said securing means forming in said vertical plane an acute clockwise angle not exceeding about 25° with the extended principal axis of said primary container, a second lateral wall of said vessel upwardly extended from said securing means forming in said vertical plane an acute counterclockwise angle of between 30° and 60° with the extended principal axis of said primary container, said second lateral wall terminating at its upper end in a dispensing mouth having a removable closure substantially tangential to said second lateral wall in a plane normal thereto, said elongated top portion connecting said second lateral wall including said dispensing mouth with said first lateral wall;

and a second means for modifying the pour spout of the primary container to increase the starting pour angle thereof in said counterclockwise direction comprising a single tube having a lower end and an upper end, said lower end connectable in fluid-tight relation to the mouth of said primary container, and said upper end connected in fluid dispensing relation to said measuring vessel through an opening which is contiguous with the upper end of said first lateral wall;

said measuring vessel being closed except for said dispensing mouth and said opening;

said measuring vessel including:
a first volumetric scale calibrated to measure the contents of said measuring vessel when said primary container is disposed in said reference position;
a second volumetric scale calibrated to measure the contents of said measuring vessel in closed condition when said container is disposed at a counterclockwise angle in said vertical plane which exceeds said increased starting pour angle of said second means;
a third volumetric scale calibrated to measure the contents entrapped in said measuring vessel when the principal axis of said primary container is disposed at a clockwise angle in said vertical plane; wherein said third scale includes remeasure calibration lines which radiate from the point in the upper end of the tube comprising said modifying pour spout into which fluid first flows to return to said primary container, said lines being so disposed as to intersect horizontal calibration lines on said first scale representing a series of equivalent volumes when said primary container is disposed in its reference position, and wherein said remeasure calibration lines are substantially parallel to the surface of the remaining fluid trapped in the measuring vessel when said primary container is tipped in said clockwise direction in said vertical plane at each of a progression of pour-back angles.

10. The method of measuring fluids dispensed from a primary container having a vertical reference position in which the mouth is disposed at its upper end, wherein said mouth includes a modifying pour spout having an upwardly extended portion which provides said primary container with a substantially increased starting pour angle when said container is rotated in a vertical plane from said reference position in a counterclockwise direction through at least a first arc, and said primary container including a measuring vessel disposed adjacent to the mouth thereof and having a coupling to the upwardly extended portion of said modifying pour spout for receiving fluid therefrom when said primary container is rotated from said reference position in said counterclockwise direction through at least said first arc, and to pour back fluid into said modifying pour spout when said primary container is rotated from said reference position in a clockwise direction through at least a third arc, said measuring vessel having a dispensing mouth with a removable closure substantially spaced apart from the coupling to said modifying pour spout and positioned relative to said modifying pour spout so that said measuring vessel starts to dispense fluid from said dispensing mouth when said primary container including said modifying pour spout is rotated from said reference position in a counterclockwise direction through a second arc which is substantially smaller than said first arc, said measuring vessel including a first scale calibrated to measure the contents thereof when said measuring vessel is rotated at least through said first arc, a second scale calibrated to measure the contents of said measuring vessel when said primary container is disposed in said vertical reference position, and a third scale calibrated to remeasure the contents when said primary container is rotated at least through said third arc, the method steps of:
rotating said primary container through at least said first arc in said counterclockwise direction in said vertical plane to pour out a measured amount of fluid from said primary container through said upwardly extended portion into said measuring vessel;
returning said primary container to said vertical reference position to remeasure the fluid in said measuring vessel;
removing the closure of said measuring vessel and rotating said primary container through an arc in said counterclockwise direction at least exceeding said second arc but substantially smaller than said first arc for dispensing a measured amount of fluid from said measuring vessel;
returning said primary vessel to said reference position to remeasure the amount of fluid remaining in said measuring vessel, and
rotating said primary container through at least said third arc in said clockwise direction in said vertical plane to remeasure the fluid in said measuring vessel and pour back a measured amount of the excess fluid remaining in said measuring vessel into said primary container.

* * * * *